United States Patent Office 3,705,211
Patented Dec. 5, 1972

3,705,211
BISPHOSPHORYLATED IMIDODITHIOCARBONATES AND METHODS FOR THEIR PREPARATION
Roger Williams Addor and David Edgar Ailman, Pennington, N.J., assignors to American Cyanamid Company, Stamford, Conn.
No Drawing. Continuation-in-part of application Ser. No. 640,836, May 24, 1967. This application July 27, 1970, Ser. No. 58,676
Int. Cl. A01n 9/36; C07f 9/40
U.S. Cl. 260—926
6 Claims

ABSTRACT OF THE DISCLOSURE

Bis-N-phosphorylated compounds represented by the structure:

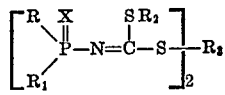

wherein R and $R_1$ are each members selected from the group consisting of loweralkyl, lower alkoxy and phenyl; X is sulfur and oxygen; $R_2$ is loweralkyl, loweralkenyl, benzyl or halo-substituted benzyl; and $R_3$ is a lower alkylene radical, such as methylene, ethylene, loweralkyl substituted ethylene, trimethylene, loweralkyl substituted trimethylene, oxydimethylene, tetramethylene or loweralkyl substituted tetramethylene. They find utility as insecticides and arachnicides and are highly effective against both the larval and adult stages of insects.

---

This application is a continuation-in-part of our copending application, Ser. No. 640,836, filed May 24, 1967, now abandoned:

The present invention relates to novel bis-N-phosphorylated compounds and to methods for preparing the same. More particularly, the invention relates to bis-N-phosphorylated compounds represented by the structure:

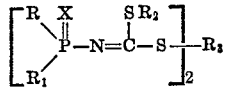

wherein R and $R_1$ are each members selected from the group consisting of loweralkyl, lower alkoxy and phenyl; X is sulfur and oxygen; $R_2$ is loweralkyl, loweralkenyl, benzyl or halo-substituted benzyl; and $R_3$ is a lower alkylene radical, such as methylene, ethylene, loweralkyl substituted ethylene, trimethylene, loweralkyl substituted trimethylene, oxydimethylene, tetramethylene or loweralkyl substituted tetramethylene.

The bis-N-phosphorylated compounds as hereinabove defined find utility as insecticides and arachnicides and are highly effective against both the larval and adult stages of insects, such as the mosquito, and may be used either as contact or systemic insecticides. Among the pests readily controlled with the compounds of the invention are the southern armyworm, bean aphid, two-spotted spider mite, large milkweed bug, German cockroach, southern corn rootworm and house fly.

In its broadest embodiment the compounds of the present invention are prepared by treating a phosphinyl isothiocyanate with a salt of an alkylene dithiol. Thereafter, the thus formed alkylene-bis-phosphinyl dithiocarbamate is alkylated with an alkyl halide, alkenyl halide, benzyl halide or halosubstituted benzyl halide to obtain the desired alkylene-bis-phosphinylimidodoithiocarbonate product.

Alternatively, those compounds in which $R_3$ is oxydimethylene are prepared by the reaction of the respective isothiocyanate with an alkali metal hydrosulfide to form the corresponding dithiocarbamate salt. This salt is further reacted with bis-chloromethyl ether to form the oxydimethylene bis-phosphinyldithiocarbamate. Treating the resultant mixture with an alkylating agent in the presence of triethylamine results in the formation of the oxydimethylene bis-phosphinylimidodithiocarbonates of the present invention. Each of the compounds thus prepared is highly effective as an insecticide, arachnicide or nematocide.

In general, the compounds of the present invention having the formula:

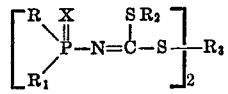

wherein R and $R_1$ are members selected from the group consisting of loweralkyl, loweralkoxy and phenyl; X is sulfur or oxygen; $R_2$ is lower alkyl, loweralkenyl, benzyl or halo-substituted benzyl; and $R_3$ is methylene, ethylene, loweralkyl substituted ethylene, trimethylene, loweralkyl substituted trimethylene, oxydimethylene, tetramethylene or lower alkyl substituted tetramethylene are prepared in two stages.

First, a phosphinyl isothiocyanate of the formula:

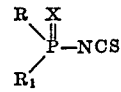

is reacted with the salt of an alkylene dithiol of the formula:

wherein M is an alkali metal, such as sodium, potassium, or lithium, or a trialkylammonium group to form an alkylene-bis-phosphinyldithiocarbamate salt. Upon acidification the alkylene-bis-phosphinyldithiocarbamate thus formed is recovered. Approximately two moles of the isocyanate reactant are used per mole of the alkylene dithiol. However, the molar ratio may be varied somewhat without seriously altering product yield. Advantageously, the reaction can be carried out over a wide range of temperatures, usually between about 0° C. and 100° C,. but it is preferred to conduct the reaction at a temperature between about 30° C. and 60° C. Graphically, the over-all reaction may be illustrated as follows:

(I)

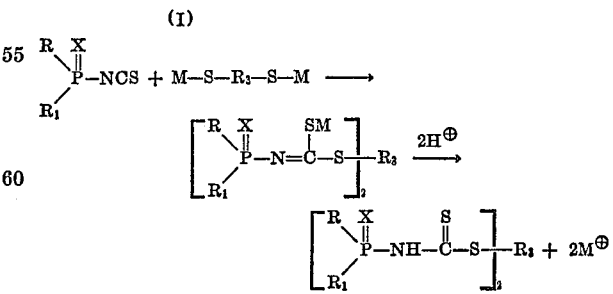

wherein R, $R_1$, $R_3$, X and M are as hereinabove defined.

Illustrative of the alkylene-bis-phosphinyldithiocarbamates so prepared are:

ethylene-bis-diethoxyphosphinyldithiocarbamate,
methylene-bis-dimethoxyphosphinyldithiocarbamate,
propylene-bis-diethylphosphinyldithiocarbamate,
tetramethylene-bis-dibutoxyphosphinyldithiocarbamate,
1,2-butylene-bis-ethoxyphenylphosphinyldithiocarbamate,
2,3-butylene-bis-diethoxyphosphinyldithiocarbamate,
2,2-dimethyltrimethylene-bis-methylphenylphosphinyldithiocarbamate,
ethylene-bis-diphenylphosphinyldithiocarbamate,
methylene-bis-diethoxyphosphinothioyldithiocarbamate,
propylene-bis-diethoxyphosphinothioyldithiocarbamate,
ethylene-bis-phosphinothioyldithiocarbamate.

Alkali metal or other salts, such as the trialkylammonium salt, of the above-identified alkylene-bis-phosphinyldithiocarbamates are alkylated or otherwise reacted in accordance with the following overall reaction:

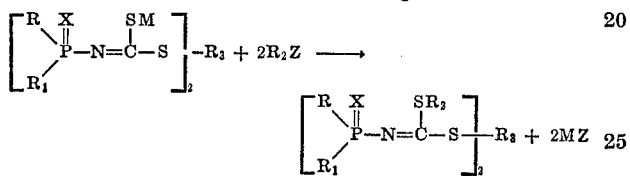

wherein R, $R_1$, $R_3$, X and M are as previously defined, $R_2$ is loweralkyl, loweralkenyl, such as allyl or methallyl, benzyl or halo-substituted benzyl, such as 4-iodobenzyl, 2,4-di-chlorobenzyl, 3,4,5-tribromobenzyl, and Z is a halogen or a p-toluenesulfonate group to form the corresponding alkylene - bis - phosphinylimidodithiocarbonates. The reaction is preferably carried out at about a one to two mole ratio of the alkylene-bis-phosphinyldithiocarbamate salt to alkyl halide, respectively.

Typical of the alkylene-bis-phosphinylimidodithiocarbonates of the present invention which may be prepared are:

S,S'-ethylene-S,S'-dibenzyl-diethoxyphosphinylimidodithiocarbonate,
S,S'-ethylene-S,S'-dimethyl-diethoxyphosphinylimidodithiocarbonate,
S,S'-propylene-S,S'-diallyl-diethoxyphosphinylimidodithiocarbonate,
S,S'-tetramethylene-S,S'-dibutyl-methylethoxyphosphinylimidodithiocarbonate,
S,S'-1,2-butylene-S,S'-di-4-bromobenzyl-diethoxyphosphinylimidodithiocarbonate,
S,S'-2,3-butylene-S,S'-di-methallyl-dimethylphosphinylimidodithiocarbonate,
S,S'-2,2-dimethyl-trimethylene-S,S'-diethyl-diethylphosphinylimidodithiocarbonate,
S,S'-propylene-S,S'-di-4-chlorobenzyl-methoxyphenylphosphinylimidodithiocarbonate,
S,S'-ethylene-S,S'-di-2,4-dichlorobenzyl-diethoxyphosphinylimidodithiocarbonate,
S,S'-ethylene-S,S'-di-2,4,6-trichlorobenzyl-diethoxyphosphinylimidodithiocarbonate,
S,S'-ethylene-S,S'-di-2,6-dibromobenzyl-diethoxyphosphinylimidodithiocarbonate,
S,S'-trimethylene-S,S'-di-2-chlorobenzyl-diphenylphosphinylimidodithiocarbonate,
S,S'-methylene-S,S'-di-4-iodobenzyl-ethylphenylphosphinylimidodithiocarbonate,
S,S'-ethylene-S,S'-di-3-fluorobenzyl-diethoxyphosphinylimidodithiocarbonate,
S,S'-ethylene-S,S'-dimethyl-diphenylphosphinylimidodithiocarbonate,
S,S'-ethylene-S,S'-dimethyl-diethoxyphosphinylimidodithiocarbonate,
S,S'-ethylene-S,S'-dimethyl-diethoxyphosphinothioylimidodithiocarbonate,
S,S'-trimethylene-S,S'-3,5-dichlorobenzyl-dimethoxyphosphinylimidodithiocarbonate,
S,S'-1,2-butylene-S,S'-dimethallyl-diethylphosphinylimidodithiocarbonate,
S,S'-propylene-S,S'-dibenzyldiphenylphosphinylimidodithiocarbonate.

An alternative method of preparing the compounds of the present invention is to treat the phosphinyl isothiocyanates of the formula:

with an alkali metal hydrosulfide, MSH, yielding the corresponding phosphinyldithiocarbamate salt:

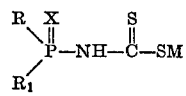

where R, $R_1$ and M are hereinabove defined. Where the latter salt is reacted with bis-chloromethyl ether and the reaction mixture acidified, there are formed oxyldimethylene bis-phosphinyldithiocarbamates of the formula:

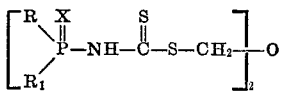

Illustrative of the oxydimethylene-bis-phosphinyldithiocarbamates so prepared are:

oxydimethylene-bis-diethoxyphosphinylidthiocarbamate,
oxydimethylene-bis-dimethoxyphosphinyldithiocarbamate,
oxydimethylene-bis-dimethylphosphinyldithiocarbamate,
oxydimethylene-bis-methoxyethylphosphinyldithiocarbamate,
oxydimethylene-bis-diphenylphosphinyldithiocarbamate.

However, when the latter reaction mixture is not acidified, but is further alkylated, as for example, with an alkyl halide:

$R_2Z$ the oxydimethylene-bis-phosphinylimidodithiocarbamates are formed having the formula:

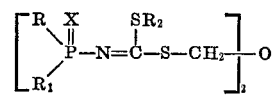

wherein R, $R_1$, $R_3$ and X are the same as defined above.

Typical of the oxydimethylene-bis-phosphinylimidodithiocarbonates formed are:

S,S'-oxydimethylene-S,S'-dibenzyldiethoxyphosphinylimidodithiocarbonate,
S,S'-oxydimethylene-S,S'-diethyl-diethylphosphinylimidodithiocarbonate,
S,S'-oxydimethylene-S,S'-di-2-chlorobenzyl-methoxyphenylphosphinylimidodithiocarbonate,
S,S'-oxydimethylene-S,S'-diallyldimethoxyphosphinylimidodithiocarbonate,
S,S'-oxydimethylene-S,S'-di-2,4,6-tribromobenzyl-phenylphosphinylimidodithiocarbonate,
S,S'-oxydimethylene-S,S'-di-3-chlorobenzyl-diethoxyphosphinothioylimidodithiocarbonate,
S,S'-oxydimethylene-S,S'-dimethallyl-diphenylphosphinylimidodithiocarbonate.

In general, to prepare compounds of the formula:

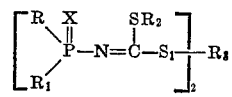

wherein $R_3$ is a methylene group, it is a good practice to react the above phosphinyldithiocarbamate salt first with an alkylating agent:

$R_2Z$ wherein $R_2$ is as defined above and Z is a halogen atom, such as chlorine, bromine or iodine.

Suitable alkylating agents employed are: methyl iodide, ethyl bromide, allyl chloride, isopropyl iodide, methallyl bromide, butyl iodide, benzyl chloride, 4-bromobenzyl chloride, 4-chlorobenzyl chloride, 2,4-dichlorobenzyl chloride, 2,6-dibromobenzyl iodide, 2,4,6-trichlorobenzyl chloride, 2-chlorobenzyl bromide, 3-fluorobenzyl bromide and 4-iodobenzyl iodide.

The alkylation step is next followed by reaction with a methylene halide, such as methylene bromide or methylene iodide to obtain the corresponding ethylene-bis-phosphinylimidodithiocarbonates as written graphically by the equations:

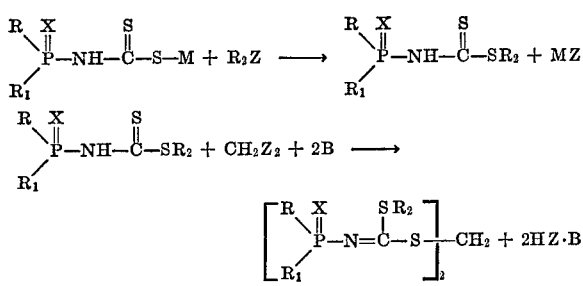

wherein B is a base, such as triethylamine, sodium carbonate or potassium hydroxide, and R, $R_1$, X and Z are the same as defined above.

The invention will be further illustrated in conjunction with the following examples which are to be taken as illustrative only and not by way of limitation. All parts are by weight unless otherwise stated.

EXAMPLE 1

Preparation of ethylene-bis-diethoxyphosphinyldithiocarbamate

The sodium salt of ethanedithiol is obtained as a colorless solid by adding the dithiol to excess sodium methoxide in ethanol under nitrogen followed by addition thereof of benzene. It is washed with ethanol-benzene and then with ether and dried in vacuo. To a cooled (room temperature) mixture of 8.5 parts of diethoxyphosphinyl isothiocyanate in 100 parts (by volume) of benzene is added 3.0 parts of ethanedithiol sodium salt. After an hour, 10 parts (by volume) of the stirred mixture is removed and the very fine solids are spun down in the centrifuge and washed with 1 part of ether. The nuclear magnetic resonance spectrum in deuterium oxide shows a singlet at 6.80τ (—CH₂—S—, 4H), a multiplet at 5.9τ (—CH₂—O—, 8H), and a doublet at 8.68τ (CH₃—C, 12H).

The remainder of the reaction mixture is mixed with water and the phases are separated. The benzene phase is washed several times with water. The combined water fractions are filtered, washed once with ether, poured into a flask, ice-cooled, and acidified with 25% hydrochloric acid. The precipitated solids are washed several times with water and vacuum dried at 45° C.–50° C. over potassium hydroxide leaving 8.7 parts (84% based on work-up of 90% of the intermediate salt) of pale yellow crystals, melting point 115° C.–118° C. Recrystallization by dissolving 5.0 parts in ethanol with slight warming followed by dilution with two volumes of hexane and cooling to −20° C. gives 3.4 parts of very fine pale yellow crystals, melting point 120° C.–125° C. at 1°/min. (dec.).

*Analysis.*—Calc'd for $C_{12}H_{26}N_2O_6P_2S_4$ (percent): C, 29.74; H, 5.29; N, 5.78; P, 12.79; S, 26.47. Found (percent): C, 30.14; H, 5.13; N, 5.75; P, 12.65; S, 26.66.

The infrared spectrum shows strong maxima at 1240, 1280, 1480, and 3080 cm.⁻¹, the latter two assignable to the

group. The nuclear magnetic resonance spectrum in deuterochloroform shows a doublet at 0.1τ (J=8 p.p.m. N—H, 2H), a singlet at 6.40τ (—S—CH₂—, 4H), a multiplet at 5.7τ (—CH₂—O—, 8H), and a triplet at 8.58τ (J=7 p.p.m. CH₃—C, 12H).

Utilizing the same procedure employed above to prepare ethylene bis-diethoxyphosphinyldithiocarbamate but with the indicated substitution of reactants, the following analogs are prepared.

(A)—Preparation of trimethylene bis-diethoxyphosphinyldithiocarbamate

By substituting propane-1,3-dithiol for ethanedithiol, melting point 89° C.–90° C.

*Analysis.*—Calc'd for $C_{13}H_{28}N_2O_6P_2S_4$ (percent): C, 31.31; H, 5.66; N, 5.62; P, 12.42; S, 25.72. Found (percent): C, 31.29; H, 5.84; N, 5.79; P, 12.24; S, 25.48.

(B)—Preparation of propylene bis-diethoxyphosphinyldithiocarbamate

By substituting propane-1,2-dithiol for ethanedithiol, melting point 114° C.–115° C.

*Analysis.*—Calc'd for $C_{13}H_{28}N_2O_6P_2S_4$ (percent): C, 31.31; H, 5.66; N, 5.62; P, 12.42; S, 25.72. Found (percent): C, 31.42; H, 5.80; N, 5.72; P, 12.64; S, 25.91.

(C)—Preparation of ethylene bis-diethoxyphosphinothioyldithiocarbamate

By substituting potassium diethoxyphosphinothioyldithiocarbamate, melting point 105° C.–110° C.

*Analysis.*—Calc'd for $C_{12}H_{26}N_2O_4P_2S_6$ (percent): C, 27.89; H, 5.07; N, 5.42; P, 11.99; S, 37.24. Found (percent): C, 28.00; H, 5.27; N, 5.60; P, 11.78; S, 37.20.

(D)—Preparation of trimethylene-bis-diethylphosphinyldithiocarbamate

By substituting diethylphosphinyl isothiocyanate for diethoxyphosphinyl isothiocyanate, and trimethylenedithiol sodium salt for ethanedithiol sodium salt, trimethylene-bis-diethylphosphinyldithiocarbamate was obtained in good yield.

(E)—Preparation of 2,3-butylene-bis-ethoxyphenylphosphinothioyldithiocarbamate

Substituting ethoxyphenylphosphinothioyl isothiocyanate for diethoxyphosphinyl isothiocyanate, and 2,3-butanedithiol sodium salt for ethanedithiol sodium salt resulted in the formation of 2,3-butylene-bis-ethoxyphenylphosphinothioyldithiocarbamate in good yield.

(F)—Preparation of tetramethylene-bis-diphenylphosphenyldithiocarbamate

By substituting diphenylphosphinyl isothiocyanate for diethoxyphosphinyl isothiocyanate, and tetramethylenedithiol sodium salt for ethanedithiol sodium salt, tetramethylene - bis - diphenylphosphinyldithiocarbamate was obtained in good yield.

EXAMPLE 2

Preparation of S,S′-ethylene-S,S′-dibenzyl-diethoxyphosphenylimidodithiocarbonate To a mixture of 1.48 parts of ethanedithiol and 3.4 parts of triethylamine in 30 ml. of benzene is added, with cooling, 5.7 parts of diethoxyphosphinyl isothiocyanate. After an hour, this mixture is added to 5.7 parts of benzyl bromide in 25 parts by volume of toluene in several portions over a ten minute period (mild temperature rise to 29° C.). After stirring overnight, the mixture is diluted with more benzene, washed (including dilute sodium hydroxide), and concentrated to give 10.7 parts of oil. Column chromatography on a total of 150 parts of silica gel yields, on sequential elution with 1:1 carbon tetrachloride:chloroform, chloroform and 2%–10% methanol in chloroform, 4.5 parts (42%) of crude product. Two recrystallizations from ether gives 2.0 parts of colorless crystalline product in two fractions, melting point 67.5° C.–68.5° C. and 64° C.–66° C.

*Analysis.*—Calc'd for $C_{26}H_{38}N_2O_6P_2S_4$ (percent): C, 46.97; H, 5.76; N, 4.22; P, 9.32; S, 19.29. Found (percent): C, 46.92; H, 5.35; N, 4.37; P, 9.39; S, 19.43.

The infrared spectrum shows maxima at 1250 and 1540 cm.$^{-1}$ attributable to the P=O and C=N functions, respectively.

By the same procedure used to prepare S,S'-ethylene S,S' - dibenzyl diethoxyphosphinylimidodithiocarbonate but with the indicated substitution of reagents, the following analogs are prepared.

(G)—Preparation of S,S'-ethylene-S,S'-dimethyl-diethoxyphosphinylimidodithiocarbonate By substituting methyl iodide for benzyl bromide, melting point 61° C.–63° C.

*Analysis.*—Calc'd for $C_{14}H_{30}N_2O_6P_2S_4$ (percent): C, 32.79; H, 5.90; N, 5.47; P, 12.08; S, 25.03. Found (percent): C, 32.76; H, 6.10; N, 5.60; P, 11.87; S, 25.11.

(H)—Preparation of S,S'-ethylene-S,S'-diethyl-diethoxyphosphinylimidodithiocarbonate By substituting ethyl bromide for benzyl bromide, melting point 27° C.–28° C.

*Analysis.*—Calc'd for $C_{16}H_{34}N_2O_6P_2S_4$ (percent): C, 35.54; H, 6.34; N, 5.18; P, 11.46; S, 23.72. Found (percent): C, 35.52; H, 6.46; N, 5.26; P, 11.40; S, 23.72.

(I)—Preparation of S,S'-trimethylene-S,S'-dimethyl-diethoxyphosphinylimidodithiocarbonate By substituting methyl iodide for benzyl bromide and propane-1,3-dithiol for ethanedithiol, there is prepared the above oily compound analyzing as follows: Calc'd for $C_{15}H_{32}N_2O_6P_2S_4$ (percent): C, 34.21; H, 6.13; N, 5.32; P, 11.76; S, 24.36. Found (percent): C, 34.15; H, 6.13; N, 5.31; P, 11.64; S, 24.47.

(J)—Preparation of S,S'-propylene-S,S'-dimethyl-diethoxyphosphinylimidodithiocarbonate By substituting methyl iodide for benzyl bromide and propane-1,2-dithiol for ethanedithiol, there is prepared an oil having the above analysis: Calc'd for $C_{15}H_{32}N_2O_6P_2S_4$ (percent): C, 34.21; H, 6.13; N, 5.32; P, 11.76; S, 24.36. Found (percent): C, 33.78; H, 5.93; N, 5.59; P, 11.60; S, 24.70.

(K)—Preparation of S,S'-ethylene-S,S'-dimethyl-diethoxyphosphinothioylimidodithiocarbonate By substituting methyl iodide for benzyl bromide and diethoxyphosphinothioyl isothiocyanate for diethoxyphosphinyl isothiocyanate, melting point 76° C.–77° C.

*Analysis.*—Calc'd for $C_{14}H_{30}N_2O_4P_2S_6$ (percent): C, 30.86; H, 5.55; N, 5.15; P, 11.37; S, 35.32. Found (percent): C, 30.65; H, 5.40; N, 5.13; P, 11.30; S, 35.30.

(L)—Preparation of S,S'-ethylene-S,S'-di-4-chlorobenzyldiethoxyphospinylimidodthiocarbonate By substituting 4-chlorobenzyl iodide for benzyl bromide, the compound S,S'-ethylene-S,S'-di-4-chlorobenzyl-diethoxyphosphinylimidodithiocarbonate was obtained, melting point 71.5–73.5° C.

*Analysis.*—Calc'd for $C_{26}H_{36}Cl_2N_2O_6P_2S_4$ (percent): C, 42.56; H, 4.95; Cl, 9.66; N, 3.82; P, 8.44; S, 17.48. Found (percent): C, 42.73; H, 5.24; Cl, 9.92; N, 3.93; P, 8.23; S, 17.20.

(M)—Preparation of S,S'-ethylene-S,S'-dibenzyl di-n-propoxyphosphinylidimidodithiocarbonate By substituting di-n-propoxyphosphinyl isothiocyanate for diethoxyphosphinyl isothiocyanate, the compound S,S'-ethylene-S,S'-dibenzyl-di - n - propoxyphosphinylimidodithiocarbonate was obtained as an oil.

*Analysis.*—Calc'd for $C_{30}H_{46}N_2O_6P_2S_4$ (percent): C, 49.97; H, 6.43; N, 3.89; P, 8.59; S, 17.79. Found (percent): C, 50.18; H, 6.98; N, 3.86; P, 8.81; S, 17.51.

(N)—Preparation of S,S'-ethylene-S,S'-dibenzyl-di-i-propoxyphosphinylimidodithiocarbonate By substituting di-i-propoxyphosphinyl isothiocyanate for diethoxyphosphinyl isothiocyanate, the compound S,S' - ethylene-S,S'-dibenzyl-di-i-propoxyphosphinylimidodithiocarbonate was obtained in good yield.

*Analysis.*—Calc'd for $C_{30}H_{46}N_2O_6P_2S_4$ (percent): C, 49.97; H, 6.43; N, 3.89; P, 8.59; S, 17.79. Found (percent): C, 49.83; H, 6.51; N, 3.93; P, 8.08; S, 18.02.

(O)—Preparation of S,S'-trimethylene-S,S'-dibenzyl-diethoxyphosphinylimidodithiocarbonate By substituting propane-1,3-dithiol for ethanediol, the compound S,S'-trimethylene-S,S'-dibenzyl - diethoxyphosphinylimidodithiocarbonate was obtained as an oil.

*Analysis.*—Calc'd for $C_{27}H_{40}N_2O_6P_2S_4$ (percent): C, 47.77; H, 5.94; N, 4.13; P, 9.12; S, 18.89. Found (percent): C, 47.51; H, 6.04; N, 4.22; P, 9.26; S, 19.16.

(P)—Preparation of S,S'-ethylene-S,S'-dibenzyl-diethoxyphosphinothioylimidodithiocarbonate By substituting diethoxyphosphinothioyl isothiocyanate for diethoxyphosphinyl isothiocyanate, the compound S,S'-ethylene-S,S'-dibenzyl-diethoxyphosphinothioylimidodithiocarbonate was obtained in good yield.

*Analysis.*—Calc'd for $C_{26}H_{38}N_2O_4P_2S_6$ (percent): C, 44.81; H, 5.50; N, 4.02; P, 8.89; S, 27.61. Found (percent): C, 44.89; H, 5.68; N, 4.06; P, 8.75; S, 27.69.

(Q)—Preparation of S,S'-tetramethylene-S,S'-dibenzyl-diethoxyphosphinylimidodithiocarbonate By substituting butane-1,4-dithiol for ethanediol, the compound S,S'-tetramethylene-S,S'-dibenzyl-dithoxyphosphinylimidodithiocarbonate was obtained as an oil.

*Analysis.*—Calc'd for $C_{28}H_{42}N_2O_6P_2S_4$ (percent): C, 48.54; H, 6.10; N, 4.04; P, 8.94; S, 18.51. Found (percent): C, 48.80; H, 5.74; N, 4.29; P, 8.64; S, 18.31.

(R)—Preparation of S,S'-2,2-dimethyltrimethylene-S,S'-di-2,4-dichlorobenzyl - dimethylphosphinylimidodithiocarbonate Substituting neopentyldithiol for ethanediol; dimethylphosphinyl isothiocyanate for diethoxyphosphinyl isothiocyanate; and 2,4-dichlorobenzyl chloride for benzyl bromide, the compound S,S'-2,2-dimethyltrimethylene-S,S'-di-2,4-dichlorobenzyl - dimethylphosphinylimidodithiocarbonate was obtained in good yield.

(S)—Preparation of S,S'-propylene-S,S'-di-4-fluorobenzylethylethoxyphosphinothioylimidodithiocarbonate Substituting propane 1,2-dithiol for ethanediol; ethylethoxyphosphinothioyl isothiocyanate for diethoxyphosphinyl isothiocyanate; and 4-fluorobenzyl iodide for benzyl bromide, the compound S,S'-propylene-S,S'-di-4-fluorobenzylethylethoxyphosphinothioylimidodithiocarbonate was obtained.

(T)—Preparation of S,S'-trimethylene-S,S'-di-2-bromobenzylethoxyphenylphosphinylimidodithiocarbonate Substituting propane 1,3-dithiol for ethanediol; ethoxyphenylphosphinyl isothiocyanate for diethoxyphosphinyl isothiocyanate; and 2-bromobenzyl bromide for benzyl bromide, the compound S,S'-trimethylene-S,S'-di-2-bromobenzyl ethoxyphenylphosphinylimidodithiocarbonate was obtained.

(U)—Preparation of S,S'-1,2-butylene-S,S'-di-2-chloro-4-iodobenzyl-dimethoxyphosphinylimidodithiocarbonate Substituting butane-1,2-dithiol for ethanediol; dimethoxyphosphinyl isothiocyanate for diethoxyphosphinyl isothiocyanate; and 2-chloro-4-iodobenzyl chloride for benzyl bromide, the compound S,S'-1,2-butylene-S,S'-di-2-chloro - 4 - iodobenzyl-dimethoxyphosphinylimidodithiocarbonate was obtained.

(V)—Preparation of S,S' - 2,3 - dimethyltetramethylene-S,S' - di - 2 - methallyl - diethoxyphosphinylimidodithiocarbonate Substituting 2,3-dimethylbutane-1,4-dithiol for ethanediol, and methallyl chloride for benzyl bromide, the compound S,S' - 2,3 - dimethyltetramethylene - S,S' - di - 2- methallyl - diethoxyphosphinylimidodithiocarbonate was obtained.

EXAMPLE 3

Preparation of S,S'-methylene-S,S'-dimethyl-diethoxyphosphinylimidodithiocarbonate To 9.6 parts of methyl diethoxyphosphinyldithiocarbamate and 4.0 parts of triethylamine in 32 parts by volume of benzene is added 5.4 parts of methylene iodide. The reaction mixture, after stirring overnight, is water-washed, and concentrated in vacuo. The oil, in methanol, stood several hours to remove the by-product, diethoxyphosphinyl isothiocyanate. The methanol is removed and the oil in benzene is rewashed. Removal of solvent leaves 8.6 parts of an oil which is further purified by column chromatography on silica gel. The product, recovered from the column with chloroform-methanol, is crystallized from ether at —20° C. to 0° C. to give two crops of white crystals totaling 4.2 parts, melting point 33° C.–34.5° C. and 32.5° C.–33.5° C., respectively.

Analysis.—Calc'd. for $C_{13}H_{28}N_2O_6P_2S_4$ (percent): C, 31.32; H, 5.66; N, 5.62; P, 12.42; S, 25.73. Found (percent): C, 31.28; H, 5.66; N, 5.50; P, 12.30; S, 25.75.

The infrared spectrum shows maxima at 1250 cm.$^{-1}$ and 1550 cm.$^{-1}$ attributable to the P=O and C=N functions, respectively.

EXAMPLE 4

Preparation of oxydimethylene-bis-diethoxyphosphinyldithiocarbamate

To an ice-cooled mixture of 0.9 part of bis-chloromethyl ether in 10 parts (by volume) of dry acetone is added 2.0 parts of potassium diethoxyphosphoryldithiocarbamate. After thirty minutes, the bath is removed and the mixture is stirred overnight. Filtration followed by concentration in vacuo gives 1.6 parts of yellow solids. The solids crystallize at room temperature from about 3:1 hexane-chloroform as pale yellow crystals, melting point 98.6° C.–99.6° C., 1.1 parts (58%).

Analysis.—Calc'd for $C_{12}H_{26}N_2O_7P_2S_4$ (percent): C, 28.79; H, 5.24; N, 5.60; P, 12.38; S, 25.62. Found (percent): C, 28.61; H, 5.30; N, 5.75; P, 12.12; S, 25.63.

The infrared spectrum shows bands at 1480 cm.$^{-1}$ and 3050 cm.$^{-1}$ attributable to the

group and at 1240 cm.$^{-1}$ for the P=O function.

Substituting potassium ethoxyphenylphosphoryldithiocarbamate for the potassium diethoxyphosphinyldithiocarbamate results in the formation of the compound oxydimethylene-bis-ethoxyphenylphosphinyldithiocarbamate.

Advantageously, the compounds may be employed for such pest control in liquid or solid formulations as sprays, dusts, dust concentrates, wettable powders, granular products, organic liquid formulations and emulsifiable concentrates. Solid formulations may be prepared by admixing the active materials with diluent carriers, such as talc, attapulgite, kaolin, diatomaceous earth, fuller's earth, and the like, with or without the addition of adjuvants, such as emulsifiers, surfactants, spreading and sticking agents. Liquid formulations, on the other hand, may be prepared by dissolving or dispensing the active material in water or in an organic solvent, generally with a small amount of emulsifier and then dispersing, dissolving, or diluting further the thus formed concentrate just prior to application. Diluents, such as water, and inexpensive organic solvents, such as fuel oils, deodorized kerosene, and the like, are conventional diluents frequently used for the above purpose.

In the example below, there is summarized outstanding insecticidal activity, attributed to the compounds of the invention.

EXAMPLE 5

Procedures for the determination of insecticidal activity southern armyworm (*Prodenia eridania* Cramer)

Compounds to be tested are made up as 0.1% and 0.01% solutions or suspensions in 65% acetone/35% water mixtures. Sieva lima bean leaves are dipped in the test solutions and set in a hood on a screen to dry. When dry, each leaf is placed in four-inch petri dishes which have a moist filter paper in the bottom, and ten third-instar armyworm larvae about ⅜ inch long are added to each dish. The dishes are covered and held at 80° F., and 60% R.H. After two days, mortality counts and estimates of the amount of feeding are made. The results are reported in Table I below.

Bean aphid (*Aphis fabae* Scopoli)

Compounds are tested as 0.1%, 0.01%, and 0.001% solutions or suspensions in 65% acetone/35% water mixtures. Two inch fiber pots, each containing a nasturtium plant two inches high and infested with about 150 aphids two days earlier, are sprayed with test solution to give complete coverage of the aphids and the plants. The sprayed plants are laid on their sides on white enamel trays which have had the edges coated with No. 50 SAE oil as a barrier. Mortality estimates are made after holding for two days at 70° F., and 50% R.H. The results are reported in Table I below.

Two-spotted spider mite (*Tetranychus urticae* Koch)

Sieva lima bean plants with primary leaves three to four inches long are infested with about 100 adult mites per leaf four hours before use in this test. The mite and egg infested plants are dipped for three seconds in the 0.01% and 0.001% solutions used in the armyworm tests, and the plants set in the hood to dry. They are held for two days at 80° F., 60% R.H., and the adult mite mortality estimated on one leaf under a stereoscopic microscope. The other leaf is left on the plant an additional five days and then examined at 10X power to estimate the kill of eggs and of newly-hatched nymphs, giving a measure of ovicidal and residual action, respectively. The results are reported in Table I.

Systemic tests

The compounds to be tested are formulated as emulsions containing 0.1 gram of test material, 0.2 gram of emulsifier, acetone, and water. This is diluted with sufficient water to give 100 p.p.m. and 10 p.p.m. emulsions. Sieva lima bean plants with only the primary leaves unfolded are cut off just above soil level and inserted into two-ounce bottles of test emulsions and held in place by a bit of cotton wrapped around the stem. The bottles are then placed in a ventilated box with the leaves extending outside the box, such that any possible fumes from the compounds will be drawn out the end of the box rather than rising to affect the test leaves. About fifty adult two-spotted spider mites are placed on each leaf. After holding three days at 80° F. and 60° R.H. mortality estimates are made and one leaf from each plant is placed on a moist filter paper in the bottom of a petri dish. Ten third-instar southern armyworm larvae are added to each dish and mortality counts are made after holding three days at 80° F. and 60% R.H. The results are reported in Table I below.

Housefly (*Musca domestica* Linnaeus)

Groups of 25 adult female houseflies are lightly anesthetized with carbon dioxide, placed in wide-mouth pint mason jars, and covered with a screen cap. The test compound is formulated as an emulsion containing 50 p.p.m. or 5 p.p.m. of test material, an emulsifier, acetone and water. The mouth of the vial is covered with a single layer of cheesecloth, inverted and placed on the screen cap, so that the flies can feed on the solution through the screen. Mortality counts are made after two days at 80° F. The results are reported in Table I below.

Southern corn rootworm (*Diabrotica undecimpunctata howardi* Barber)

The compound is formulated as a dust and incorporated into the soil at the equivalent of 50 and 10 pounds per acre. The soil is sub-sampled into bottles, and ten 6- to 8-day old rootworm larvae added to each bottle, which is then capped. Mortality counts are made after six days at 80° F., 60% R.H. The results are reported in Table I below.

TABLE I

| Structure | Armyworm 0.1% | Armyworm 0.01% | Aphids 0.1% | Aphids 0.01% | Aphids 0.001% | Mites 0.01% | Mites 0.001% | Systemics Mites P.p.m. 100 | Systemics Mites P.p.m. 10 | Systemics Armyworm P.p.m. 100 | Systemics Armyworm P.p.m. 10 | Housefly P.p.m. 50 | Housefly P.p.m. 5 | Root worms Lbs./a. 50 | Root worms Lbs./a. 10 |
|---|---|---|---|---|---|---|---|---|---|---|---|---|---|---|---|
| $[(C_2H_5O)_2\overset{O}{\underset{\parallel}{P}}-NH-\overset{S}{\underset{\parallel}{C}}-S-CH_3]_2$ | 100 | 100 | 100 | 100 | 100 | 100 | 100 | 100 | 100 | 100 | 100 | 100 | 12 | 100 | 100 |
| $[(C_2H_5O)_2\overset{S}{\underset{\parallel}{P}}-NH-\overset{S}{\underset{\parallel}{C}}-S-CH_3]_2$ | 100 | 0 | 100 | 100 | 20 | 100 | 0 | 100 | 69 | 100 | 100 | 100 | 0 | 100 | 100 |
| $(C_2H_5O)_2\overset{O}{\underset{\parallel}{P}}-NH-\overset{S}{\underset{\parallel}{C}}-S-CH(CH_3)_2$ | 100 | 100 | 100 | 100 | 100 | 100 | 56 | 100 | 100 | 100 | 100 | 100 | 0 | 65 | 0 |
| $(C_2H_5O)_2\overset{S}{\underset{\parallel}{P}}-NH-\overset{S}{\underset{\parallel}{C}}-S-CH_2CH_3$ | 100 | 100 | 100 | 100 | 100 | 100 | 100 | 100 | 20 | 100 | 0 | 100 | 0 | 100 | 100 |
| $[(C_2H_5O)_2\overset{O}{\underset{\parallel}{P}}-NH-\overset{S}{\underset{\parallel}{C}}-S-CH_2-]_2CH_2$ | 100 | 0 | 100 | 80 | 0 | 69 | 0 | 0 | | 0 | | 0 | | 100 | 0 |
| $[(C_2H_5O)_2\overset{S}{\underset{\parallel}{P}}-NH-\overset{S}{\underset{\parallel}{C}}-S-CH_2-]_2CH_2$ | 100 | 100 | 100 | 90 | 0 | 100 | 0 | 100 | 100 | 100 | 100 | 100 | 72 | 50 | 0 |
| $[(C_2H_5O)_2\overset{O}{\underset{\parallel}{P}}-NH-\overset{S}{\underset{\parallel}{C}}-S-CH_2-]_2O$ | 100 | 100 | 0 | 0 | 0 | 0 | 0 | 0 | | 0 | | 20 | 0 | 100 | 40 |
| $[(C_2H_5O)_2\overset{O}{\underset{\parallel}{P}}-N=\overset{SCH_3}{\underset{|}{C}}-S-CH_2-]_2$ | 100 | 100 | 100 | 0 | 0 | 100 | 100 | 100 | 0 | 100 | 0 | 88 | 0 | 0 | |
| $[(C_2H_5O)_2\overset{O}{\underset{\parallel}{P}}-N=\overset{SCH_3}{\underset{|}{C}}-S-]_2CH_3$ | 100 | 100 | 100 | 90 | 0 | 100 | 0 | 100 | 95 | 100 | 100 | 100 | 100 | 35 | 0 |
| $(C_2H_5O)_2\overset{O}{\underset{\parallel}{P}}-N=\overset{SCH_3\ CH_3}{\underset{|}{C}}-S-CH$ | 100 | 100 | 100 | 20 | 0 | 98 | 0 | 100 | 80 | 100 | 100 | 20 | 0 | 100 | 0 |
| $(C_2H_5O)_2\overset{O}{\underset{\parallel}{P}}-N=\overset{SCH_3}{\underset{|}{C}}---CH_2$ | 100 | 100 | 100 | 98 | 0 | 100 | 0 | 100 | 86 | 100 | 100 | 0 | | 0 | 0 |
| $[(C_2H_5O)_2\overset{O}{\underset{\parallel}{P}}-N=\overset{SC_2H_5}{\underset{|}{C}}-S-CH_2-]_2$ | 100 | 100 | 100 | 100 | | 100 | | 100 | | 100 | | | | 100 | 60 |

TABLE—Continued

| Structure | Armyworm | | Aphids | | | Mites | | | Systemics | | | | | | |
|---|---|---|---|---|---|---|---|---|---|---|---|---|---|---|---|
| | | | | | | | | | Mites | | Armyworm | | Housefly | | Root worms |
| | 0.1% | 0.01% | 0.1% | 0.01% | 0.001% | 0.01% | 0.001% | P.p.m., 100 | P.p.m., 10 | P.p.m., 100 | P.p.m., 10 | P.p.m., 50 | P.p.m., 5 | Lbs./a., 50 | Lbs./a., 10 |
| $[(C_2H_5O)_2\overset{O}{\overset{\|}{P}}-N=C\overset{SCH_2C_6H_5}{\underset{S-CH_2-}{}}]_2$ | 100 | 100 | 100 | 80 | 0 | 98 | 0 | 100 | 90 | 100 | 100 | 100 | 84 | 100 | 40 |
| $[n\text{-}C_3H_7O)_2\overset{O}{\overset{\|}{P}}-N=C\overset{S-CH_2C_6H_5}{\underset{S-CH_2-}{}}]_2$ | 100 | 100 | 100 | 90 | 0 | 90 | 0 | 100 | 50 | 100 | 0 | 56 | 0 | 100 | 0 |
| $[(C_2H_5O)_2\overset{O}{\overset{\|}{P}}-N=C\overset{SC_6H_5}{\underset{S-CH_2-}{}}]_2$ | 100 | 100 | 100 | 50 | 0 | 65 | 0 | 100 | 98 | 100 | 100 | 96 | 28 | 60 | 0 |
| $[(C_2H_5O)_2\overset{O}{\overset{\|}{P}}-N=C\overset{S-CH_2C_6H_4Cl}{\underset{S-CH_2-}{}}]_2$ | 100 | 100 | 100 | 95 | 20 | 69 | 0 | 90 | 44 | 100 | 70 | 100 | 0 | 100 | 80 |
| $[(C_2H_5O)_2\overset{O}{\overset{\|}{P}}-N=C\overset{S-CH_2C_6H_5}{\underset{S-CH_2-}{}}]_2$ | 100 | 0 | 25 | ---- | ---- | 0 | ---- | 0 | ---- | 30 | ---- | ---- | ---- | ---- | 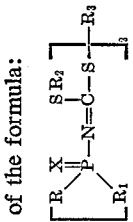 35 |
| $[(C_2H_5O)_2\overset{S}{\overset{\|}{P}}-N=C\overset{S-CH_2C_6H_5}{\underset{S-CH_2-}{}}]_2$ | 100 | 100 | 100 | 98 | 50 | 0 | 0 | 0 | 0 | 0 | ---- | 100 | 0 | 100 | 90 |
| $[(i\text{-}C_3H_7O)_2\overset{O}{\overset{\|}{P}}-N=C\overset{S-CH_2C_6H_5}{\underset{S-CH_2-}{}}]_2$ | 100 | 100 | 100 | 0 | 0 | 0 | ---- | 100 | 0 | 60 | 0 | 100 | 0 | 0 | ---- |
| $[(C_2H_5O)_2\overset{O}{\overset{\|}{P}}-N=C\overset{S-CH_2C_6H_5}{\underset{S-CH_2CH_2-}{}}]_2$ | 100 | 0 | 90 | 0 | 0 | 0 | ---- | 0 | ---- | 0 | ---- | 40 | ---- | 0 | ---- |
| $[(n\text{-}C_3H_7O)_2\overset{O}{\overset{\|}{P}}-N=C\overset{SCH_2C_6H_5}{\underset{S-CH_2CH_2-}{}}]_2$ | | | | | | | | | | | | | | | |

We claim:
1. A compound of the formula:

$$\left[ R\underset{R_1}{\overset{X}{\overset{\|}{P}}}-N=C\overset{SR_2}{\underset{S}{}}\right]_2 R_3$$

wherein R and $R_1$ are each members selected from the group consisting of loweralkyl, loweralkoxy and phenyl; X is either sulfur or oxygen; $R_2$ is loweralkyl, loweralkenyl, benzyl or halo-substituted benzyl; and $R_3$ is methylene, ethylene, loweralkyl-substituted ethylene, trimethylene, loweralkyl-substituted trimethylene, tetramethylene, loweralkyl substituted tetramethylene or oxydimethylene.

2. The compound of claim 1: S,S'-trimethylene-S,S'-dibenzyl-diethoxyphosphinylimidodithiocarbonate.
3. The compound of claim 1: S,S'-ethylene-S,S'-dibenzyl-diethoxyphosphinylimidodithiocarbonate.
4. The compound of claim 1: S,S'-methylene-S,S'-dimethyl-diethoxyphosphinylimidodithiocarbonate.
5. The compound of claim 1: S,S' tetramethylene-S,S'-dibenzyl-diethoxyphosphinylimidodithiocarbonate.
6. The compound of claim 1: S,S'-methylene-S,S'-dibenzyl-diethoxyphosphinylimidodithiocarbonate.

References Cited

UNITED STATES PATENTS 2,907,775  10/1959  Dunbar ———————— 260—926

LEWIS GOTTS, Primary Examiner
R. L. RAYMOND, Assistant Examiner

U.S. Cl. X.R.

260—453 R, 939; 424—204